United States Patent [19]

Nijenhuis

[11] Patent Number: 4,832,561

[45] Date of Patent: May 23, 1989

[54] LOADING SYSTEM WITH TRASH SILOS

[75] Inventor: Harry Nijenhuis, Hoogeveen, Netherlands

[73] Assignee: Hydro Mecanique Research S.A., Luxembourg, Luxembourg

[21] Appl. No.: 39,727

[22] Filed: Apr. 20, 1987

[30] Foreign Application Priority Data

Apr. 25, 1986 [CH] Switzerland ........................ 1710/86

[51] Int. Cl.[4] ........................ B65G 67/20; B65D 88/06

[52] U.S. Cl. ...................................... 414/500; 220/1.5; 414/303; 414/332

[58] Field of Search ............... 414/288, 293, 340, 498, 414/500, 303, 332; 100/69; 220/1.5, 1 V

[56] References Cited

U.S. PATENT DOCUMENTS

| | | | |
|---|---|---|---|
| 1,760,305 | 5/1930 | Fildes | 220/1.5 |
| 2,622,771 | 12/1952 | Tulou | 220/1.5 X |
| 3,417,883 | 12/1968 | Felts | 414/303 |
| 3,753,506 | 8/1973 | Palmer et al. | 414/303 X |
| 4,416,384 | 11/1983 | Bjurling | 220/1.5 |

FOREIGN PATENT DOCUMENTS

| | | | |
|---|---|---|---|
| 60371 | 9/1982 | European Pat. Off. | 414/345 |
| 1074312 | 1/1960 | Fed. Rep. of Germany | 100/69 |
| 2905865 | 8/1980 | Fed. Rep. of Germany . | |
| 2074727 | 10/1971 | France . | |
| 2118397 | 7/1972 | France . | |

*Primary Examiner*—Robert J. Spar
*Assistant Examiner*—R. Katz
*Attorney, Agent, or Firm*—Bernard, Rothwell & Brown

[57] ABSTRACT

A trash collection and removal system has a horizontal set-up surface with a plurality of standing stations for several vertically disposed cylindrical trash silos having respective pivotable covers at the two axial ends. A horizontal loading surface traveled by trash collection vehicles is arranged above the set-up surface by a distance approximately equal to the axial length of the silos. By means of this system, the costs for transport of the trash to dump sites or to incineration facilities can be substantially reduced.

11 Claims, 3 Drawing Sheets

LOADING SYSTEM WITH TRASH SILOS

BACKGROUND OF THE INVENTION

1. Field of the Invention

This invention relates to improvements in the art of trash handling.

Trash is collected in cities and collecting facilities with trash collection vehicles and is transported to a dump site or incineration facility. If the dump site or incineration facility is situated at a great distance from the collection area, the collection vehicles must travel great distances. This is uneconomical, because the trash collection vehicles, with their special apparatus for receiving the trash, are expensive, and have, relative to their price, a limited transport capacity. Accordingly, it is desirable to load trash from trash trucks into silos at a collection area and then move loaded silos from the collection area to a disposal facility such as a dump site or incinerator.

2. Prior Art

French Pat. No. 2 074 727 discloses a loading system with trash silos having a silo set-up surface and a parallel trash truck travel surface. In such a system the trash silos have slightly conical walls, and at one end, have a cover that pivots about a vertical axis for loading and emptying. With the cover open, the silos are placed horizontally against a discharge opening of a trash collection shaft. The trash is then conveyed out of the shaft into the silo by means of a horizontally traveling compactor at the lower end of the shaft. This system is relatively complicated in construction. The open collecting shafts lead to annoying noise, so that this system can cause noise pollution in collection centers. In addition, it does not operate with optimal economic efficiency.

Other loading systems having trash silos are disclosed in DE-A No. 2 905 865, French Pat. No. 2 118 397, U.S. Pat. No. 3,753,506 and U.S. Pat. No. 3,417,883.

SUMMARY OF THE INVENTION

This invention provides a loading system and a trash silo which facilitates an economical removal of trash from collection facilities. The invention achieves this by providing trash silos that can be set up vertically on standing stations to receive trash and having a second pivotably cover at the opposite end for emptying the trash silo, with the vertical distance between the set-up surface and the loading surface approximately corresponding to the axial length of the trash silo, and by providing the trash silos with cylindrical walls and supports running parallel to the cylindrical axis of the silo and a coupling device for coupling the silo to a cable from the transport vehicle.

The system according to the invention can be built in a central collection area. The trash collection vehicles then have a minimal transport distance and can be used very economically. The silos can have a containment capacity many times that of trash collection vehicles. In addition, the trash can be highly compacted in the upright silos. The transport of the trash to the dump site or incineration facility is therefore much less expensive. In addition, this transport can be accomplished with relatively few transport vehicles, because the silos standing upright at the waiting locations represent a cushion tending to even out the irregular supply of trash delivered by the trash collection vehicles.

DESCRIPTION OF THE PREFERRED EMBODIMENT

Figure 1:
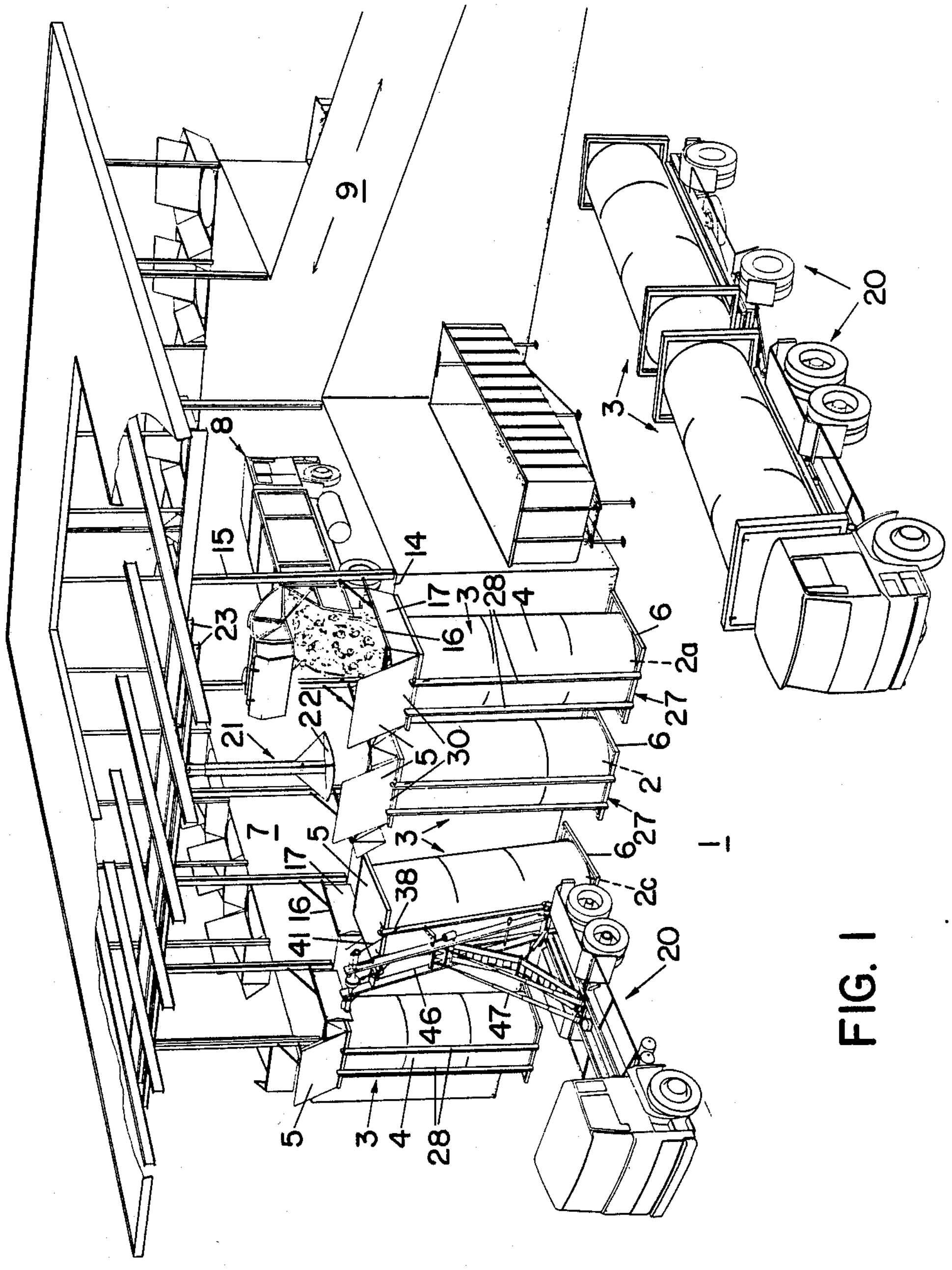
FIG. 1 is a perspective view of a loading system according to the invention.

The system illustrated in FIG. 1 has a horizontal set-up surface 1 with a plurality of standing stations 2 for several vertically standing trash silos 3 having circular cylindrical walls 4 and respective pivotable covers 5, 6 at the two axial ends. Above the set-up surface 1 and spaced from the axial length of the silos 3 there is arranged a horizontal loading surface 7 which is traveled by trash collection vehicles 8. An inclined ramp 9 leads from the set-up surface 1 to the loading surface 7. The space beneath the loading surface 7 can be utilized, for example, for material storage or as a garage or workshop.

The loading surface 7 is rectangular and has straight edges 14. Vertical supports 15 are arranged at regular intervals along the edges 14, which intervals are larger than the width of a silo 3. Pivot axes 16, which project horizontally perpendicular to the edge 14 and about which two funnel sheets 17 pivot above each standing station 2, are attached to these vertical supports 15. As a silo 3 is set up or loaded onto a transport vehicle 20, the funnel sheets 17 are disposed vertically and are therefore spaced somewhat laterally from the silo 3, as is illustrated in the example of the standing station 2*c*. If the silo 3 is to be filled, the funnel sheets 17 are disposed at an angle (see, e.g. standing station 2*a*), so that their lower edges slightly overlap the edge of the fill opening of the silo 3, thus avoiding the possibility of trash falling over the edge of the silo opening.

An hydraulic or pneumatic telescoping stamp 21 with a round, horizontal base plate 22 is disposed vertically above the standing stations 2 and can travel laterally on rails 23. The trash in the silos 3 can be compacted by means of this stamp 21.

The trash silos 3 are manufactured of steel. The circular cylindrical wall 4 is supported by a support frame 27 consisting of two adjacent supports 28 having a U-shaped cross section arranged parallel to the cylinder axis, and by respective square base frames 29 arranged at the axial ends of the wall 4 and connected with the supports 28. The upper cover 5, in the upright position of the silo, can pivot about an axis 30 near the two supports 28, while the pivot axis 31 of the lower cover 6 is arranged on the diametrically opposite side (see FIG. 2). In the open position, the upper cover 5, together with the funnel sheets 17, forms a filling funnel. The lower cover 6 serves to empty the silo 3 at a dump site or in incineration facilities. Both covers 5, 6 are sealed against the wall 4 with respective elastomeric sealing rings 32 (see FIG. 3).

A coupling device 38 in the form of a coupling element 40, which can slide along a longitudinal guide 39 attached to the support 28, is arranged on each of the supports 28 for a cable 41 from the transport vehicle 20. The slide path of the coupling element 40 is limited near the upper end of the support 28 by a stop 42 and by an additional stop at the bottom at about shoulder height.

To load the silo 3, the transport vehicle 20 travels backwards to a point near the silo 3 and pivots its loading bridge 46 into a nearly vertical position by means of two telescoping cylinders 47. the cables 41 are unwound until their end loops can be coupled to the coupling elements 40 abutting their lower stops. The cables are then partially rewound, whereby the coupling elements 40 slide upward along their guides 39. The vehicle 20 is then moved back until it nearly contacts the silo 1. The cables 41 are then further rewound until the coupling elements 40 abut their upper stops 42. As the loading bridge 46 is lowered, the cable 41 causes the silo 3 to tip and finally become loaded onto the loading bridge 46, whereby it rests on its supports 28. The unloading takes place in reverse order.

Figure 2:
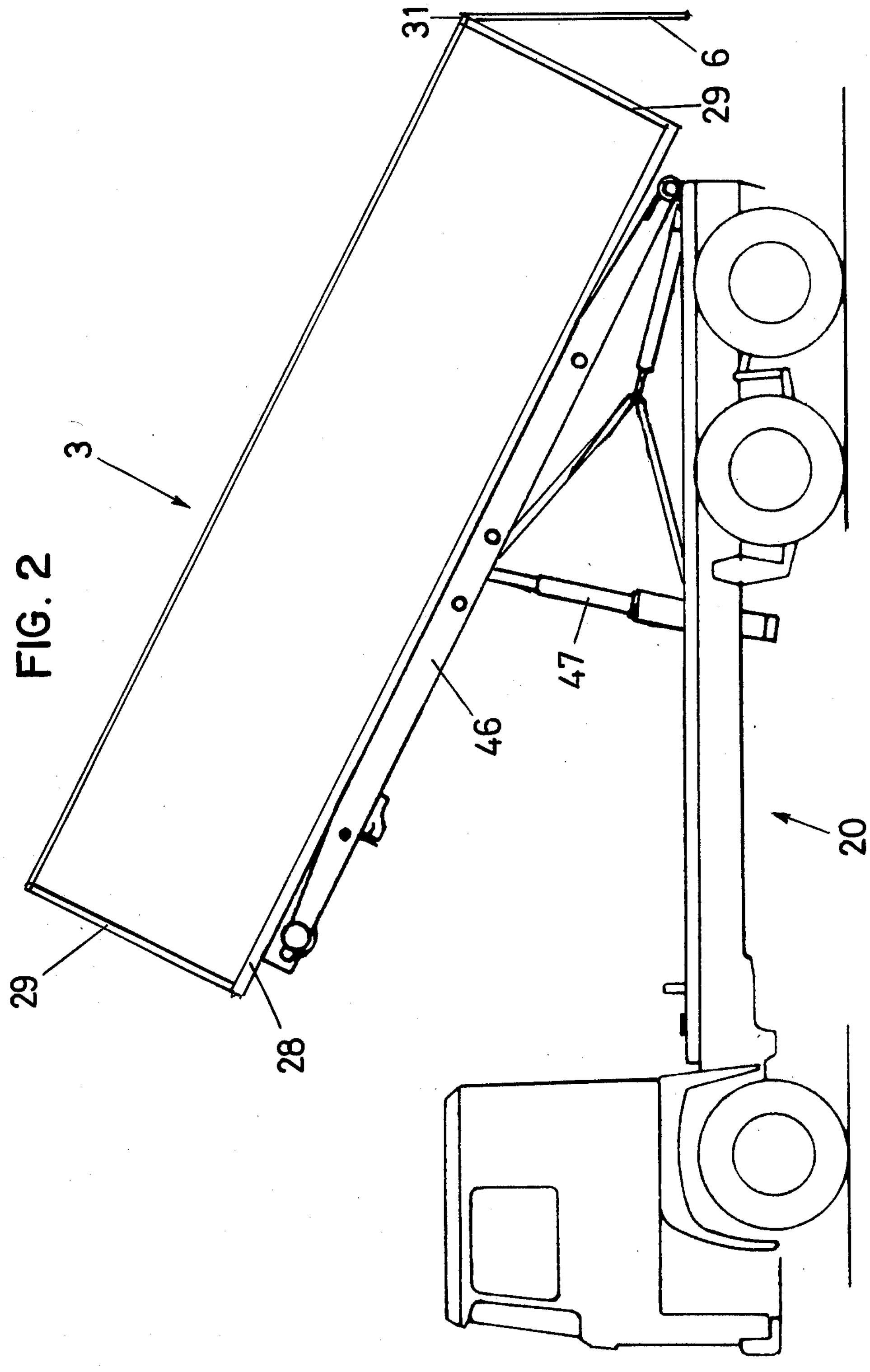
FIG. 2 is a side view of a silo on a transport vehicle.
Figure 3:
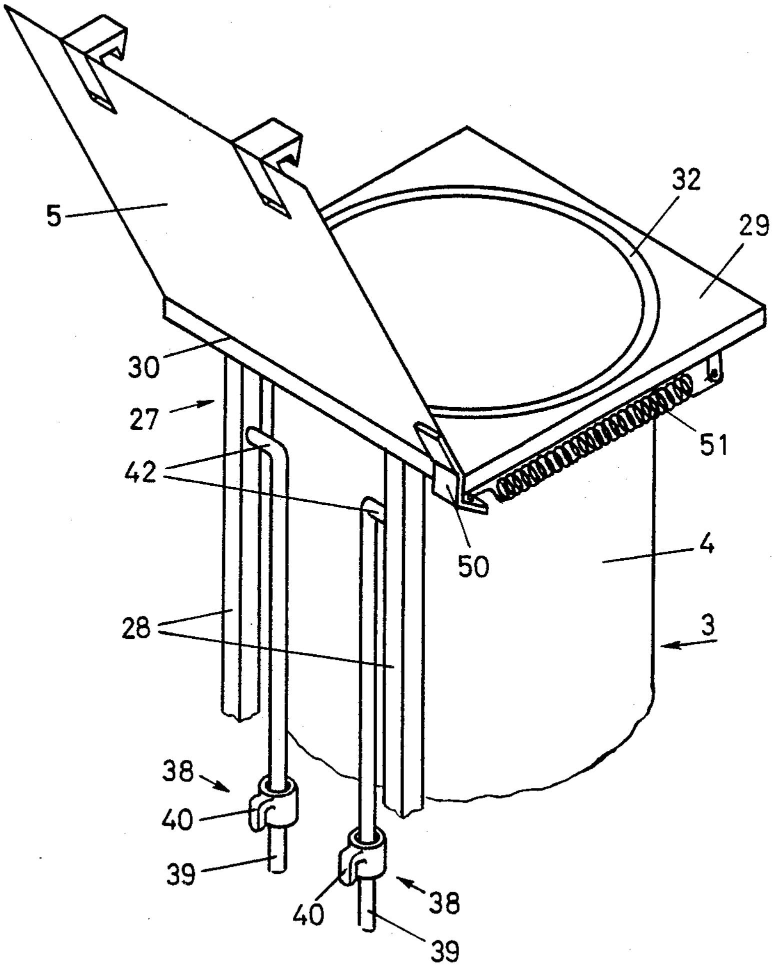
FIG. 3 is the upper edge of a silo with a raised cover.

In FIG. 2, the silo 3 is illustrated on the transport vehicle 20 in the position of being emptied, where the lower cover 6 is released and pivoted about its axis 31. Due to the sealing ring 32, the silo 3 is sealed during loading and transport. In order to facilitate the opening of the upper cover 5, a downwardly bent lever 50 is attached adjacent its pivot axis 30. A pre-biased spring 51 engages the free end of this lever 50, and the other end of this spring 51 is supported against the frame 29.

I claim:

1. A loading system with trash silos, which have at one end a pivotable cover for loading the trash silo, the system having a set-up surface with a plurality of standing stations for the trash silos and a parallel loading surface arranged above the set-up surface to be traveled on by trash collection vehicles, characterized in that the trash silos are designed to be set up vertically on the standing stations and have a second pivotable cover at the opposite end for emptying the trash silo, and in that the vertical distance between the set-up surface and the loading surface approximately corresponds to the axial length of the trash silo, and means for moving the loaded silos from a vertical position to a horizontal position and means for transporting the loaded silos away from the set-up surface while they are in a horizontal position.

2. System according to claim 1, characterized in that a compactor stamp for compacting the trash is arranged vertically above at least one of the standing stations.

3. System according to claim 2, characterized in that the compactor stamp can travel laterally above the standing stations.

4. System according to claim 1 characterized in that two pivotable funnel plates are arranged vertically above each standing station and project over the loading surface, whereby the relative spacing of the pivot axes of the funnel sheets is greater than the width of the trash silos.

5. A trash silo for use in a loading system for loading trash silos, the silo having a wall and a pivotably cover at one axial end as well as a support frame including two supports, characterized in that the wall is cylindrical and has a second pivotable cover at its other axial end, in that said supports extend longitudinally of the silo wall and extend generally the length of the silo wall and are arranged parallel to the cylindrical axis, and in that the trash silo has a coupling device on each support for coupling with a cable of a transport vehicle, whereby the silo may be moved by means of the cable to and from horizontal and vertical positions.

6. A trash silo according to claim 5, characterized in that a sealing ring is arranged between each of the two ends of the wall and the respective covers.

7. A trash silo according to claim 5 characterized in that at both ends of the wall, the support frame has a square base which is arranged perpendicular to the cylinder axis and is connected to the supports.

8. A trash silo according to claim 5 characterized in that the coupling device includes a coupling element which can slide along the supports between stops.

9. A trash silo according to claim 5 characterized in that the upper cover, in the upright position of the trash silo, can pivot about an axis adjacent the two supports and the lower cover can pivot about an axis lying diametrically opposite.

10. A loading system for trash silos which have a pivotably cover at one end for loading, the system having a set-up surface with a plurality of stations for setting up the silos in a vertical position and a loading surface generally parallel and located above the set-up surface for loading trash from collection vehicles into the silos, an improved loading system having the vertical distance between the set-up surface and loading surface corresponding approximately to the axial length of the trash silos so that the silos may be loaded while standing vertically at the set-up surface, and further comprising; a pivotable cover on the other end of the silo for unloading, a transport vehicle and cooperating means on the transport vehicle and on each of the silos for moving the silos from or into a vertical loading position at the set-up surface to or from a horizontal transporting position.

11. A loading system for trash silos as defined in claim 10 wherein the cooperating means comprises a pivotable loading bridge carried by the transport vehicle, coupling elements slidable in support guide means on the silos, and cables attached to the transport vehicles and to the coupling elements.

* * * * *

UNITED STATES PATENT AND TRADEMARK OFFICE
CERTIFICATE OF CORRECTION

PATENT NO. : 4,832,561

DATED : MAY 23, 1989

INVENTOR(S) : HARRY NIJENHUIS

It is certified that error appears in the above-identified patent and that said Letters Patent is hereby corrected as shown below:

Column 1, line 39, delete "DE-A" and substitute therefor -- West German Pat. --;

Column 2, line 9, before "DESCRIPTION" insert -- DETAILED --.

Signed and Sealed this

Seventeenth Day of April, 1990

*Attest:*

HARRY F. MANBECK, JR.

*Attesting Officer*

*Commissioner of Patents and Trademarks*